(12) United States Patent
Puranik

(10) Patent No.: US 10,170,111 B2
(45) Date of Patent: Jan. 1, 2019

(54) ADAPTIVE INFOTAINMENT SYSTEM BASED ON VEHICLE SURROUNDING AND DRIVER MOOD AND/OR BEHAVIOR

(71) Applicant: Toyota Motor Engineering & Manufacturing North America, Inc., Erlanger, KY (US)

(72) Inventor: Nishikant Narayan Puranik, Farmington Hills, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/422,024

(22) Filed: Feb. 1, 2017

(65) Prior Publication Data

US 2018/0204570 A1    Jul. 19, 2018

Related U.S. Application Data

(60) Provisional application No. 62/447,975, filed on Jan. 19, 2017.

(51) Int. Cl.
*G06F 15/00* (2006.01)
*G10L 15/22* (2006.01)
(Continued)

(52) U.S. Cl.
CPC .............. *G10L 15/22* (2013.01); *B60K 35/00* (2013.01); *G06F 3/048* (2013.01); *G10L 15/24* (2013.01);
(Continued)

(58) Field of Classification Search
USPC .................................. 704/231–257, 270–275
See application file for complete search history.

(56) References Cited

U.S. PATENT DOCUMENTS 7,684,984 B2    3/2010    Kemp
7,930,676 B1    4/2011    Thomas
(Continued)

FOREIGN PATENT DOCUMENTS

GB        2521434 A        6/2015

OTHER PUBLICATIONS

Kumar, "Intelligent In-Vehicle Infotainment (IVI)", Mindtree: http://www.mindtree.com/sites/default/files/mindtree-ghoutht-posts-white-paper-intelligent-in-vehicle-infotainment-ivi.pdf, Oct. 5, 2016.
(Continued)

*Primary Examiner* — Jesse S Pullias
(74) *Attorney, Agent, or Firm* — Dinsmore & Shohl LLP

(57) ABSTRACT

A vehicular infotainment system, a vehicle and a method of controlling interaction between a vehicle driver and an infotainment system. A multimedia device, a human-machine interface and sensors are used to collect in-vehicle driver characteristic data and extra-vehicle driving conditions. The system additionally includes—or is otherwise coupled to—a computer to convert one or both of traffic pattern data and vehicular positional data into a driver elevated cognitive load profile. In addition, the computer converts the driver characteristic data into a driver mood profile. The system can process these profiles to selectively adjust one or both of the amount of time needed to accept audio commands from a driver and the amount of time needed to provide an audio response to the driver in situations where the system determines the presence of at least one of the elevated cognitive load and a driver mood.

17 Claims, 5 Drawing Sheets

(51) Int. Cl.
  *G10L 15/24* (2013.01)
  *H04N 21/414* (2011.01)
  *B60K 35/00* (2006.01)
  *G06F 3/048* (2013.01)
  *H04N 21/422* (2011.01)
  *H04N 21/442* (2011.01)
  *H04N 21/45* (2011.01)

(52) U.S. Cl.
  CPC .. *H04N 21/41422* (2013.01); *H04N 21/42202* (2013.01); *H04N 21/44218* (2013.01); *H04N 21/45* (2013.01); *G10L 2015/223* (2013.01)

(56) References Cited

U.S. PATENT DOCUMENTS

| | | | |
|---|---|---|---|
| 8,744,691 B2 | 6/2014 | Tsimhoni et al. | |
| 9,147,297 B2 | 9/2015 | Ricci | |
| 9,165,280 B2 | 10/2015 | Basson et al. | |
| 2010/0042410 A1* | 2/2010 | Stephens, Jr. | G10L 13/10 704/260 |
| 2013/0030645 A1 | 1/2013 | Divine et al. | |
| 2013/0131907 A1* | 5/2013 | Green | G05D 1/0055 701/23 |
| 2013/0325482 A1* | 12/2013 | Tzirkel-Hancock | G10L 15/22 704/275 |
| 2014/0229175 A1* | 8/2014 | Fischer | G10L 15/22 704/235 |
| 2015/0006541 A1* | 1/2015 | Hampiholi | G06F 17/30053 707/741 |
| 2015/0217777 A1* | 8/2015 | Konigsberg | B60W 50/08 701/36 |
| 2015/0228129 A1* | 8/2015 | Cox | G07C 5/0808 701/29.1 |
| 2015/0302718 A1* | 10/2015 | Konigsberg | A61B 5/18 340/575 |
| 2016/0104486 A1 | 4/2016 | Penilla et al. | |
| 2016/0288708 A1* | 10/2016 | Chang | B60Q 9/00 |

OTHER PUBLICATIONS

Rosenfeld et al., "Learning Drivers' Behavior to Improve Adaptive Cruise Control", Journal of Intelligent Transportation Systems, vol. 19, 2015—Issue 1, Feb. 21, 2014, pp. 18-31, Abstract.

* cited by examiner

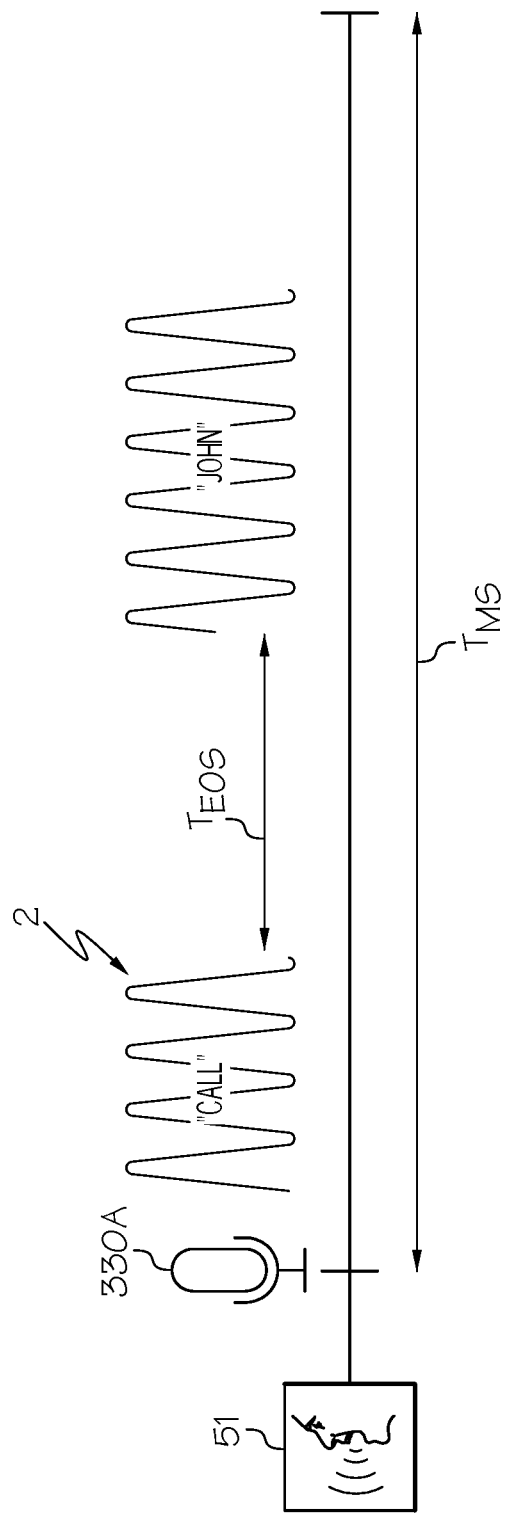

ADAPTIVE INFOTAINMENT SYSTEM BASED ON VEHICLE SURROUNDING AND DRIVER MOOD AND/OR BEHAVIOR

This application claims the benefit of U.S. Provisional Patent Application Ser. No. 62/447,975, filed Jan. 19, 2017.

TECHNICAL FIELD

The present specification relates generally to a vehicular information and entertainment system that is responsive to voice commands from a driver, and more particularly to such a system that dynamically adjusts its responses to driver voice commands by acting upon system-perceptible extra-vehicle driving conditions in conjunction with system-perceptible variations in such commands that can be correlated to a driver's mood.

BACKGROUND

It is known that vehicles have in-car information and entertainment (i.e., infotainment) systems that combine computer-based hardware and software to provide audio and video information, entertainment and vehicular interface and control through (among other things) near-field and far-field wireless cellular and internet connectivity, navigation, audio and video or the like, all though enhanced switches, hands-free and other driver/passenger/user interfacing equipment, including speech recognition interfacing. These known speech recognition systems have parameters and settings which are statically formed in the software when the system is initially installed into a vehicle. In such circumstances, significant redesign must take place to one or both of the software and hardware in order to implement these new or reconfigured features. While variations of these systems may allow changing some of these parameters, such changes can only be effected through relatively cumbersome setting changes that can lead to driver confusion and frustration.

While it is known to have vehicular infotainment systems that adaptively respond to driver moods, the author of the present disclosure has determined that there remains a need for providing an adaptive infotainment system that takes into consideration both indicia of driver mood changes as well as extra-vehicle parameters (such as traffic conditions or the like) that can be used as a way to determine if a driver is being exposed to a period of elevated cognitive load and if so, how to use data corresponding to such parameters as a way to dynamically alter the interaction between the system to the driver such that the driver spoken instructions and infotainment system audio feedback is simplified irrespective of changes in one or both of cognitive load and driver mood.

SUMMARY

In one embodiment, a vehicular infotainment system is disclosed. The system includes a multimedia device that has one or more of an audio player and a video player and a human-machine interface (HMI) for acquiring first and second driver characteristic data portions that correspond to baseline and instant driver mood, respectively. The system also includes (or is otherwise coupled to) one or more sensors for acquiring extra-vehicle driving conditions in the form of traffic pattern data, vehicular positional data or the like. The system additionally includes (or is otherwise coupled to) a computer that is signally cooperative with the sensors, multimedia device and HMI so that a processor, memory and program instructions stored in such memory cooperate to have the computer convert one or both of the traffic pattern data and vehicular positional data into a driver elevated cognitive load profile. In addition, the computer converts the driver first and second characteristic data portions into respective baseline and instant driver mood profiles so that the computer can then selectively adjust an audio response from the multimedia device to a driver in situations where the computer determines the presence of at least one of the elevated cognitive load profile and a difference between the instant driver mood profile and the baseline driver mood profile.

In another embodiment, a vehicle is disclosed that includes a platform made up of a wheeled chassis that is propelled by an engine that is coupled to a guidance apparatus cooperative with the wheeled chassis and the engine in order to provide motive control, as well as an infotainment system as discussed in the previous embodiment.

In yet another embodiment, a method of controlling interaction between a vehicle driver and an infotainment system is disclosed. The method includes detecting various signals that make up the criteria used to determine if an adjustment in the interaction between the driver and vehicle needs to take place. The signals that make up the criteria are sensed from various sources. The method includes acquiring driver characteristic data using one or more sensors mounted within a passenger compartment of a vehicle, as well as acquiring one or both of traffic pattern data and vehicular positional data using one or more vehicle-mounted sensors. The method further includes configuring the infotainment system to have a multimedia device with an HMI such that a computer that is either a part of or signally cooperative with the multimedia device and the one or more sensors can cooperate with program instructions stored in computer memory to have the program instructions to (a) convert a first portion of the driver characteristic data into a baseline driver mood profile, (b) convert a second portion of the driver characteristic data into an instant driver mood profile, (c) selectively lengthen the amount of time that the HMI accepts the second portion of the driver characteristic data from a driver if a determination is made by the computer of at least one of the elevated cognitive load profile and a difference between the instant driver mood profile and the baseline driver mood profile, and (d) selectively adjust at least an audio response from the multimedia device to a driver if a determination is made by the computer of at least one of the elevated cognitive load profile and a difference between the instant driver mood profile and the baseline driver mood profile.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 depicts a sample audio interaction between a driver and the infotainment system in accordance with one or more embodiments shown or described herein.

DETAILED DESCRIPTION

Figure 1:
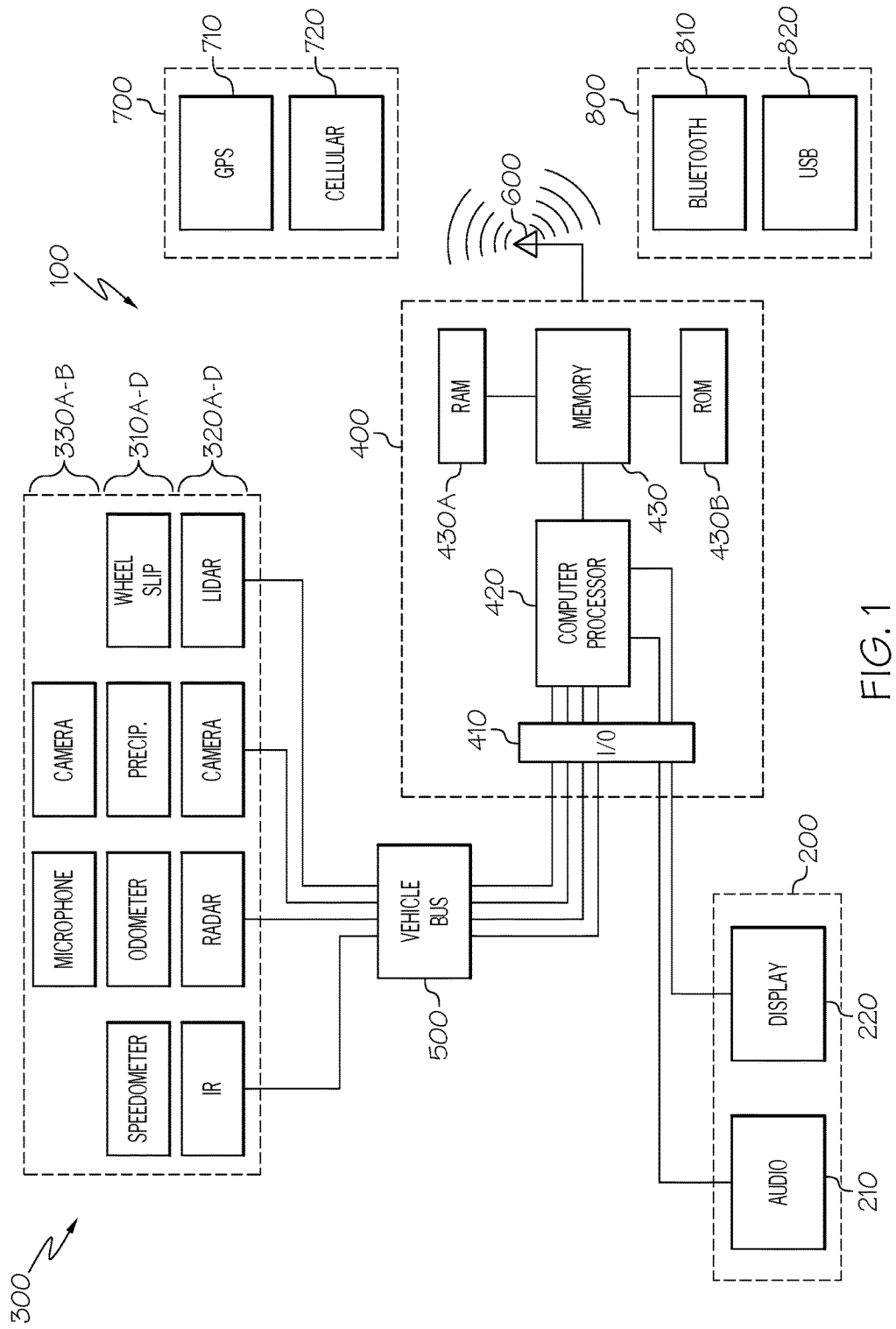
FIG. 1 depicts a block diagram of some of the functional units within an adaptive infotainment system in accordance with one or more embodiments shown or described herein.

Embodiments disclosed herein include adapting the infotainment system to at least one of the vehicle's surroundings and a driver's behavior or mood in a way that helps increase the system task completion rate, which in turn helps reduce driver distraction and frustration associated with using the system. In particular, the speech recognition (also referred to herein as voice recognition) portion of the infotainment system includes a dynamic (i.e., adaptable) feature that is based on the use of different inputs (such as those signals derived from a communication system made up of camera, GPS, radar, lidar, IR, acoustic, as well as braking patterns, accelerator patterns or the like) that can be algorithmically processed in order to understand both the driver's current mood as well as how certain road or traffic conditions can increase a driver's cognitive load in ways that can be equated to driver mood. As such, it can extend traditional unsupervised speaker adaptation that normally analyzes driver voice characteristics (such as tone or pitch) to also take into consideration speech timeout parameters and the perceived mood for performing unsupervised speaker adaptation of driver voice commands. An example of traditional unsupervised speaker adaptation may be found in U.S. Pat. No. 6,804,647 that is assigned to Nuance Communications, Inc. of Burlington, Mass. and the content of which is incorporated in its entirety by reference.

With particular regard to the elevated cognitive load profile associated with factors such as the traffic patterns or vehicular position may range from no additional cognitive load to extreme cognitive load; these factors may be used to quantify the ranges within the driver load profile. Once the algorithm has established the driver mood or behavior the second of which may also use operational inputs such as the aforementioned braking or accelerator use, the system dynamically varies one or more recognition parameters and adjusts its audio response in order to improve driver interaction. For example, if the pattern recognition algorithm detects during a period of time that the driver is not in a good mood, or that the driver is operating the vehicle on a congested highway, then parameters (for example, maximum speech duration, speech timeout or the like) used by a speech recognition engine (also referred to as a speech engine) would be increased in order to adapt to differing input from the driver that is deemed to be algorithmically commensurate with the perceived mood. The system would likewise make response or feedback adjustments in such circumstances. In one exemplary form, the system may make the verbal response shorter in situations where the driver is in a bad or stressed mood, while in another exemplary form, the system may simplify the audio response even more by only playing intuitive tones during such periods. Within the present context, the various profiles are understood to form computer-readable indicia of a sensed event or parameter. By way of example, the driver elevated cognitive load profile would correspond to digital information storable in the computer memory that—when acted upon by the processor pursuant to the control logic, program instructions, program code or related algorithm—can be used to provide a quantitative evaluation of a heightened degree of traffic- or position-related difficulty that can contribute to driver confusion, frustration or anger associated with operating the vehicle.

Figure 2:
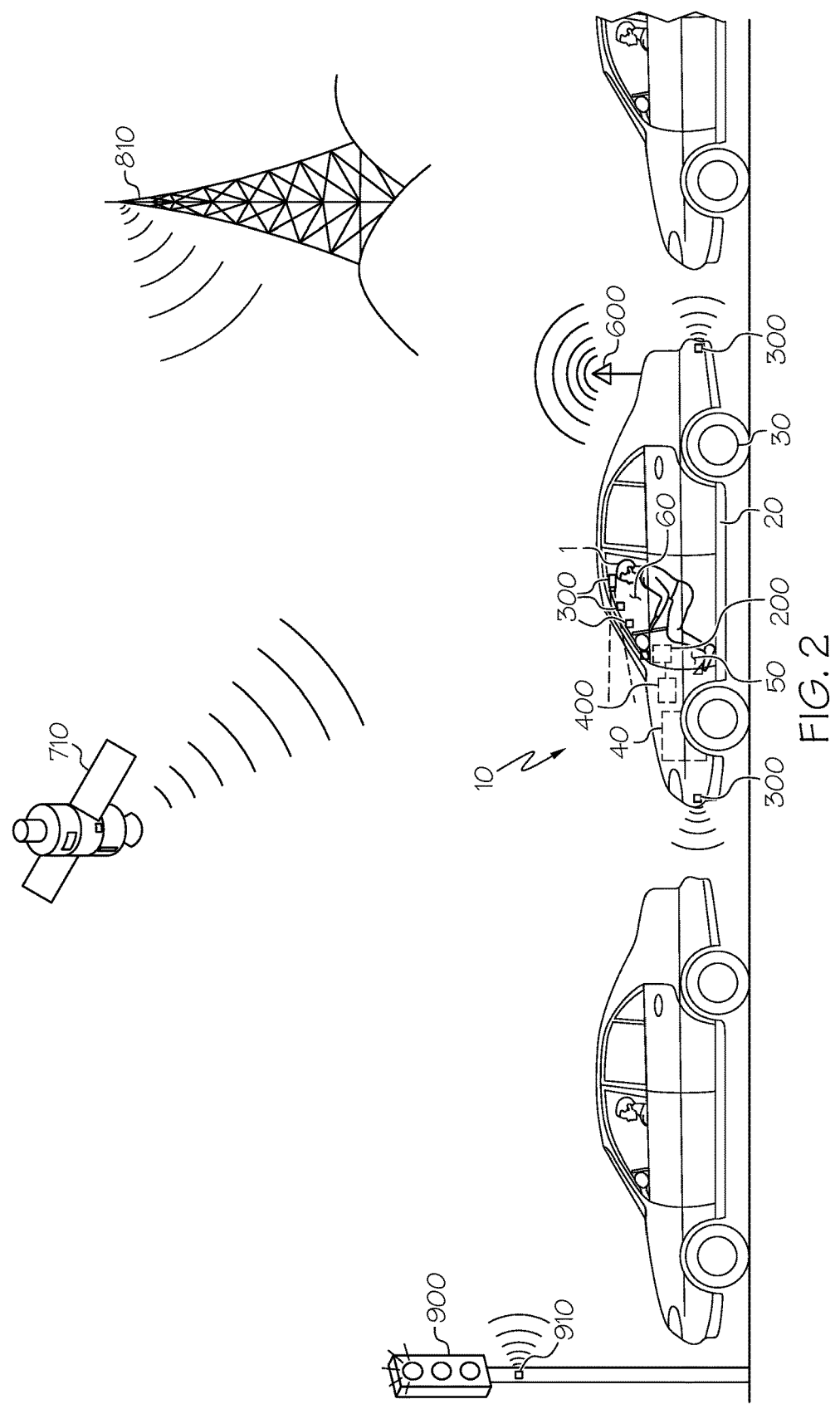
FIG. 2 depicts a vehicle using the adaptive infotainment system of FIG. 1.

Referring first to FIGS. 1 and 2, a block diagram (FIG. 1) depicting some of the functional attributes of an adaptive infotainment system 100 and a vehicle 10 in spatial relation to other vehicles in a traffic pattern (FIG. 2), both in accordance with the present disclosure, are shown. Referring with particularity to FIG. 2, vehicle 10 includes a chassis 20 with a plurality of wheels 30. Chassis 20 may either be of body-on-frame or unibody construction, and both configurations are deemed to be within the scope of the present disclosure. A motive power unit 40 such as a conventional internal combustion engine (ICE), battery pack, fuel cell stack or a hybrid combination of one or more of the above may be situated in or on the chassis 20 to provide propulsive power to the vehicle 10. As shown, the motive power unit 40 is situated underneath a hood that is placed at the fore end of vehicle 10. A guidance apparatus 50 (which may include, among other things, steering wheel 50A, accelerator 50B, brakes 50C and gear shifter 50D, all as shown in FIG. 2) is used in cooperation with the wheels 30, motive power unit 130, transmission and other systems to control movement of the vehicle 10. A passenger compartment 60 is formed inside the chassis 20 and serves not only as a place to transport passengers and cargo, but also as a place from which a driver may operate vehicle 10. A transmission (not shown) is coupled to the motive power unit 40 such that together they form a drivetrain through which a torque may be applied to some or all of the wheels 30.

The vehicle 10 location relative to other vehicles, including adjacent-vehicle closeness, speed of movement, frequency of lanes changes and other factors can be used to infer traffic pattern data. Likewise, the location of the vehicle 10 to known markers, including traffic lights, merge lanes, exit ramps, intersections, construction zones, school zones or the like can be used to infer vehicular positional data; such data can be gleaned from GPS 710 data, as well as from news-reporting sources (which could be delivered over cellular 720 network), in addition to roadside transceivers (such as sensor 910).

Referring with particularity to FIG. 1, infotainment system 100 includes an integrated multimedia device 200 in conjunction with telematics functions in order to provide the driver with single-point access to audio and video information (including entertainment, navigation, news, traffic, weather or the like), as well as vehicle diagnostics and other driver-assistance features. Numerous sensors (shown generally as 300) are mounted throughout the vehicle 10 in order to acquire on-board information, extra-vehicular information and driver information. Examples of on-board information sensors include those sensors 310A-D associated with monitoring the health of various components (such as the engine, brakes, oil, coolant temperature, fuel, airbags, seatbelts, door or window settings, battery, alternator or the like, none of which are shown), as well as those used to take ambient condition measurements around the vehicle 100, such as air temperature, precipitation, wheel slip or the like, all as understood by those skilled in the art.

Examples of the extra-vehicular information sensors 320A-D include those to help the driver with spatial awareness of the vehicle 100, including information associated with traffic conditions, road conditions, vehicular position information or the like. Such sensors 320A-D may be used to acquire data in one or more bands in the electromagnetic spectrum, including optical, infrared (IR), microwave (RF) or the like. As such, these sensors could include configurations based on radar, camera, IR, lidar, acoustic or related technologies. Although each of sensors 310A-D and 320A-D are shown as being four in number, it will be appreciated that more or fewer may be used, depending on the need to acquire various parameters in and around the vehicle 100.

Examples of driver information sensors 330A-B include those positioned in the passenger compartment 60 of the vehicle 100. In one form, camera-based optical sensors 330B can determine a driver's facial expression (including those regions around the eyes), position within the passenger compartment 60 or the like, and acoustic-based sensors 330A (such as a microphone or related audio transducer) used to acquire voice samples from the driver 1; these acoustic- (or audio-) based sensors can also be used to detect loud sounds that may form a distraction to the driver 1. In situations where the driver information sensors 330A-B are being used to collect facial data, suitable facial recognition algorithms (as will be discussed in more detail below) can then be applied to the acquired images from these sensors 300 to help determine the mood of the driver 1. Likewise, the aforementioned speech recognition engine 150 (which will be discussed in more detail in conjunction with FIG. 4) can then be applied to convert any captured voice data to help determine the identity, tone or mood of the driver 1. In another form (not shown), redundant sensors 330A-B may be used, as well as other forms of data-acquiring equipment. For example, IR sensors (not shown) could be used to detect a driver's temperature, while steering-wheel mounted or embedded sensors (not shown) could be used to measure various driver 1 biometric parameters such as heart rate, temperature, blood pressure, blood presence, blood composition, or the like.

One or more computers 400 are set up as electronic control units (ECUs) that may be situated in the vehicle 100. When numerous computers 400 are present, it will be understood that they may be placed in various locations within the vehicle, including the engine compartment, passenger compartment 60, or any other location where such placement is advantageous. Although shown schematically as being in or around the passenger compartment 60 in general (and behind the dashboard 70 in particular), it will be appreciated that the computer 400 is situated in any suitable location within vehicle 100 where access to wiring, harnesses or busses is readily available. In addition, it will be appreciated that computer 400 may be one of many such control units within the vehicle 100, depending on the desired degree of integration or autonomy among such control units. The computer 400 may receive and read sensor 300 signals as a digital input in any suitable form, such as a pulse width modulated (PWM) digital input or the like.

Computer 400 is provided with input/output (I/O) 410, central processing unit (CPU, also referred to herein as microprocessor) 420, and memory 430 in the form of read-only memory (ROM) 430A and random-access memory (RAM) 430B, Processor 420 may be either general-purpose or embedded, either of which can implement any of numerous instruction set architectures. Various program instructions form the control logic needed to provide the HMI 200 with the adaptability as discussed herein; these instructions may be stored in the ROM 430A or RAM 430B in manners known to those skilled in the art. The control logic may be embodied in an algorithm or related program code that can be manipulated or otherwise operated on by CPU 420 and then conveyed via I/O ports 410 to HMI 200. In one form of I/O 410, signals from the various sensors 300 and the HMI 200 are exchanged with computer 400. Other such signals, such as those associated with other vehicular systems (such as motive power unit 40) may also be signally provided to computer 400 for suitable processing by the control logic. Although not shown, other forms of (typically magnetic or optical) computer-accessible medium that can be used for data and control logic storage may be used, including compact disk (CD), digital video disk (DVD) and various volatile or non-volatile media such as flash memory or the like may also form a part of memory 430. Within the present context, the terms "program instructions", "control logic", "computer-readable program code", "computer-readable instructions" and their variants are deemed to be interchangeable insofar as they refer to algorithmic instructions that may be stored memory 430 and acted upon by processor 420. In one embodiment, the I/O 410 may coordinate the data exchange between the processor 420, memory 430 and any peripheral devices that rely upon or otherwise utilize the data. Likewise, in some embodiments, the I/O 410 may perform any necessary timing protocol or other data transformations to convert data signals from a format required for one component into a format suitable for use by another component.

A bus 500 is used as a signal carrier network to provide wired connectivity for of the computer 400 and its various components to the data arriving from the sensors 300, as well as the exchange between the HMI 200 and computer 400. It will be appreciated by those skilled in the art that in certain circumstances, some of the data may not be delivered through the bus 500 to the computer 400, and that embodiments either using or not using the bus 500 for all such connections are deemed to be within the scope of the present disclosure. While some or all of the program instructions and related software components are stored in memory 430 for execution by the processor 420, in other embodiments, such memory or program execution may be carried out on another device and then communicated to computer 400 through the bus 500 or related inter-computer communication protocol. It will be appreciated by those skilled in the art that boundaries between various components and their respective operations are somewhat arbitrary, and that various structural arrangements are within the scope of the present disclosure so long as ability to preserve the selective dynamic adjustment of the system 100 receipt of driver 1 commands and its subsequent response. For example, the lines of demarcation between the infotainment system 100, a telematics system and the computer 400 used to provide the control over such systems may be blurred depending on the degree of structural integration between them. This may particularly be the case when the computer 400 is formed of numerous distributed parts that are common with other devices, such as the HMI 200 in general or the infotainment system 100 in particular, among others. In such case, it may be that in variants of the disclosed system, one or more of the computer 400 features depicted in FIG. 1 may be formed as part of the HMI 200 or system 100. It is likewise contemplated within the present disclosure that various transmitters and receivers (such as wireless receiver and transmitter in the form of antenna 600 shown in FIGS. 1 and 2, along with associated circuitry) and other wireless communication equipment that are used to establish signal communication between vehicle 10 and other remote devices (such as GPS 710) may be formed as part of—or independently from—computer 400 or HMI 200, and that all such variants are deemed to be within the scope of the present disclosure. Thus, by way of example, it will be appreciated that in one form, the HMI 200 may have its own autonomous antenna (not shown) with which to achieve wireless communication with GPS 710, while in another it can use common equipment with the other components (such as the computer 400) so that input and output can go directly through such other components. In this way, redundancy of components may be avoided in certain situations, while having prime-reliable backup may be provided in other circumstances. Moreover there may be more than one wireless transceiver situated in or on vehicle 10 and such transceivers such as 600 may be configured to have one or both near-field and far-field communications capability, including Bluetooth for the former and cellular (such as those covered under various 802.11 protocols). Such transceiver configurations permit the vehicle 10 telematics system to communicate with remote systems via satellite or cellular internet, as well as with local computing devices (such as smartphones, portable computers or the like) of the driver 1 or vehicle occupants. As such, many of the components discussed herein may be part of (or work in conjunction with) a vehicle-to-infrastructure (V2I) and vehicle-to-vehicle (V2V) communication system to wirelessly send and receive outside source of data, such as that delivered over the internet through near-field communications (such as Bluetooth, WiFi or related mechanisms) or far-field communications (such as cellular or satellite). The vehicle 10 also may include wired connections such as USB 820 that allow on-board computing devices to be plugged into the vehicle 10 for additional communication, as well as device battery charging. It is understood that the different sensors 300 discussed above may interface directly with the system 100 or via the vehicle bus 500 depending upon whether the sensors 300 are provided by the vehicle manufacturer or are aftermarket components. In some embodiments, the I/O 410 may include support for devices of varying bus 500 standards, such as Peripheral Component Interconnect (PCI), Universal Serial Bus (USB) or the like. Likewise, in another embodiment, some or all of the functionality of I/O 410 (for example, interface to memory 430), may be incorporated directly into processor 410, and that all such variants are deemed to be within the scope of the present disclosure.

In one form, the inclusion of (or access to) near-field 600 and far-field 700 wireless telecommunications equipment is through cellular, satellite, Bluetooth or related compatible components, in possible addition to wired communication via USB or conventional audio jack connectivity. Further within the present context, the sensors 300 discussed herein, along with their related wiring and instrumentation, are deemed to be either cooperative with or a part of the multimedia device which in turn may be interchangeable with—as well as form a part of—the HMI 200 in general or the infotainment system 100 in particular.

Figure 3:
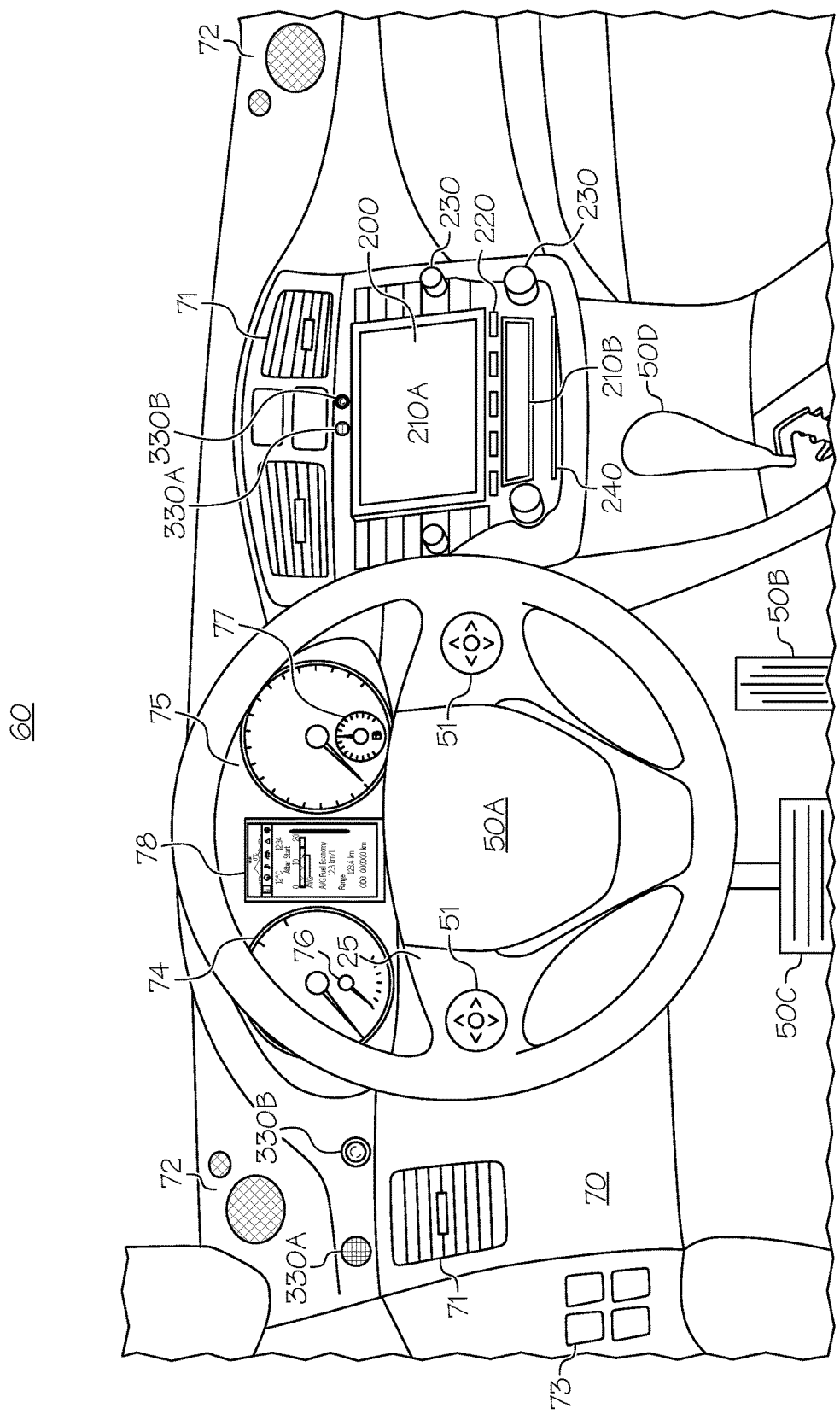
FIG. 3 depicts a driver's view of a dashboard within a vehicular passenger of the vehicle of FIG. 2.

Referring next to FIG. 3, the driver's portion of a vehicle passenger compartment 60 is shown. A dashboard 70 is situated within the passenger compartment 60 and is used to house various controls, knobs, dials, buttons, switches or the like for heating, ventilation and air conditioning (HVAC) outlets 71, audio speakers 72, toggle switches (such as for window control, door locks, mirror adjustment or the like) 73, gear shifter or selector 145 and other driver or passenger interfaces that are commonly associated with vehicle operability. Likewise, various gauges may include a speedometer 74, tachometer 75, coolant temperature 76, fuel gauge 77 or the like. A multi-information display (MID) 78 may be disposed between the tachometer and speedometer, and may be visually represent various vehicular systems by screen-based graphical-user interface (GUI) icons that provide driver with menu-driven visual information pertaining to one or more vehicular systems. In one form, these gauges are coupled to the aforementioned on-board information sensors 300 so that they can provide vehicle and engine speed data to the computer 400.

By way of example, the multimedia device 200 of the infotainment system 100 can be centrally located within the passenger compartment 60 such that its display 220 provides television-like images of regions in or around the vehicle 100 that are within visual range of the various cameras IR, radar or lidar imagers that make up some of the extra-vehicular information sensors 320A-D. In addition, display 220 can be made to show a map, clock, compass, radio station list, as well as various other messages commonly associated with vehicular telematics. As shown, the display 220 may be made up of sub-displays 220A in the form of a larger graphical display and a smaller alphanumeric display 220B, one or more selector buttons 220, control knobs 230, media input/output (shown presently as a CD or DVD slot 240, as well as other features known to those in the telematics art. In one form, the multimedia device 200 may be integrated into the dashboard 70 and receive inputs from other vehicle sensors or subsystems as further described below. The input/output 210 is in the form of a microphone or related acoustic-to-electric transducer or sensor to receive and convert voice signals into an equivalent analog or digital signal. In some embodiments, sub-display 220A may include—in addition to or in place of selector buttons 220, control knobs 230—a touchpads, virtual keyboard or any other means for inputting instructions into the multimedia device 200.

As mentioned above, in one form, the driver information sensors 330A-B that are situated within the passenger compartment 60 include an audio transducer such as microphone 330A, as well as a camera 330B or related visual-image acquisition device, this latter device capable of gathering facial recognition information. In one form, such facial features may include shapes of mouth, eyes or the like, as well as other indicia of the driver 1 head, such as nose, forehead, chin, ears, lips, or the like. The collected facial recognition information can be stored in a memory 430. As with the comparison between baseline and instant driver 1 audio data, a comparison facial features may also be stored in memory 430. This facial recognition may be associated with a confidence level or related accuracy rating to determine whether the sensed data is deemed sufficiently reliable to justify its continued use within the system 100.

Additional sensors and transmitters that are not mounted to the vehicle 10 may be formed as part of a traffic system that includes a traffic light 900, stop sign, speed limit signs, highway-based electronic active driver notification signs or the like; an example of such a sensor (which may also be coupled to or formed as part of a transceiver) 910 is shown in FIG. 3 as being attached to traffic light 900. These sensors and transmitters may be operated by a government entity or private provider of traffic information such that data generated therein may be received by one or more sensors 300 within vehicle 10. These non-vehicle sensors 910 provide information about the environment around the vehicle 10. Referring again to FIG. 2, such environment may include vehicle location or positional data such as that provided via GPS 710, or may include traffic data, as well as other data that is fed to it from third-party sources of weather-tracking data, vehicle maintenance data or the like. The computer 400 may also perform signal processing of the data received from such sensors 910. Examples of such signal processing may include stochastic signal processing, adaptive signal processing, as well as other signal processing techniques known to those skilled in the art.

Figure 4:
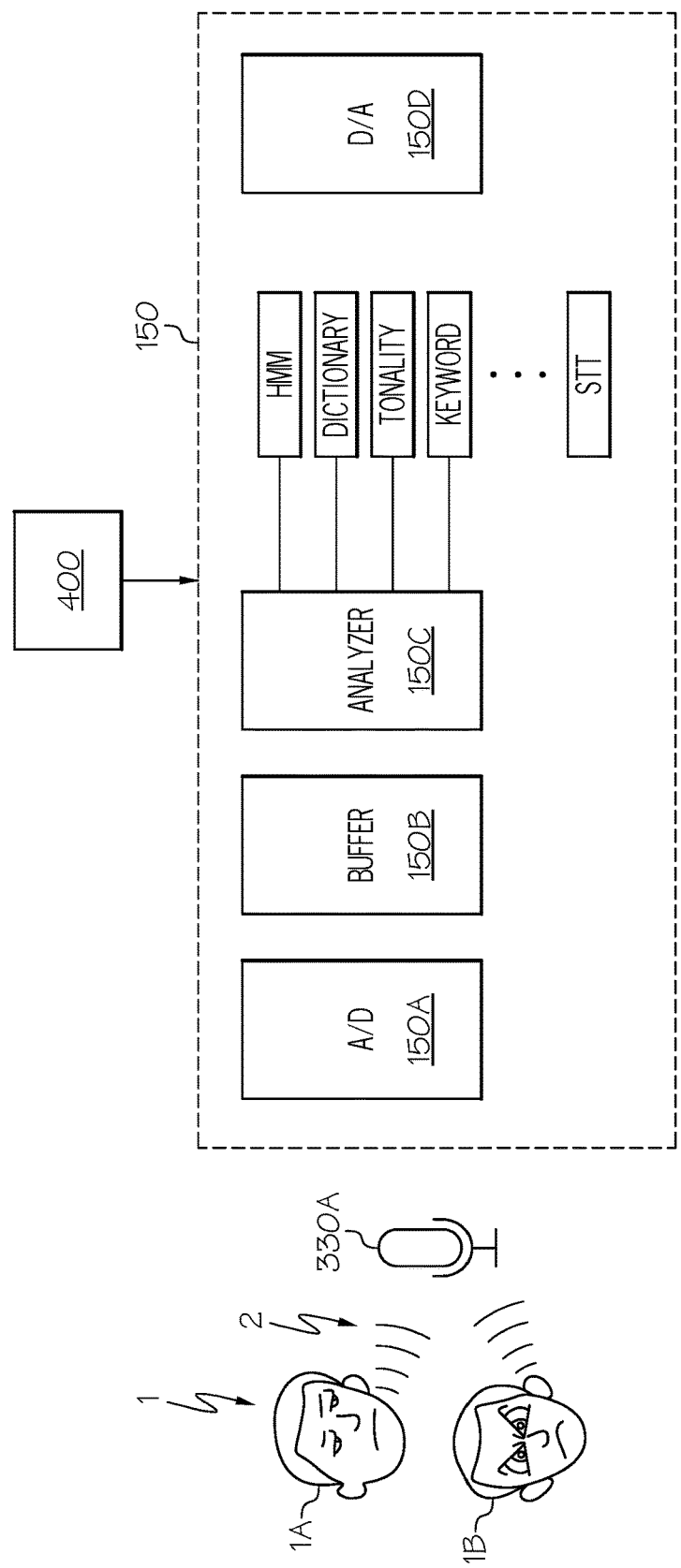
FIG. 4 depicts a notional interaction between a driver and a speech recognition engine portion of the infotainment system as part of a sequence of events used to assess a driver's mood in accordance with one or more embodiments shown or described herein.

Referring next to FIGS. 4A and 4B, both a block diagram depicting an interaction between the driver 1 and the infotainment system 100 and a flowchart associated with such interaction are shown. Referring first to FIG. 4, a speech command 2 is provided by a driver 1 into microphone 330A. Although not presently shown, camera 330B may also be used to acquire facial expression images. As presently depicted in FIG. 4, the facial expressions 1A and 1B for driver 1 may correspond respectively to a so-called "normal" mood (i.e., one substantially devoid of any emotional content) and a so-called "emotional" mood (i.e., one containing a measurable emotional content). Although the facial expression 1B is shown depicting an angry or otherwise agitated mood for driver 1, it will be appreciated that other such expressions (such as happy, sad, tired or the like) may also be recognized by the system 100. The received voice command 2 is then routed to the speech recognition engine 150 that is made up of numerous components known to those skilled in the art; such components may include an analog-to-digital (A/D) converter 150A that samples the voice command 2 and converts the spoken audio signal into a digitized equivalent. The voice data signal may then be transferred to a speech buffer 150B, which creates a voice data stream of the spoken command 2. This stream may then be sent to one or more matching analyzers 150C that can act as part of an overall speech-to-text (STT) conversion (if needed), as well as detect tonality, amplitude (i.e., loudness or volume), frequency, keyword or phrase matching or the like in order to establish a more complete voice profile that can be stored in memory (such as memory 430). These analyzers 105C may include probability calculation units based on speech recognition models (such as the known hidden Markov Model (HMM) or the like), one or more grammatical dictionaries, language search units and other components or modules needed to perform the speech recognition functions discussed herein. Although shown as a separate structure in FIG. 4, in one form, the speech recognition engine 150 and its various components or modules may be implemented as software stored in memory 430.

Metrics may be used by the probability calculation units to establish confidence levels as a way to determine a degree of certainty associated with the acquired voice command input in a manner similar to that of the facial recognition and related visual data acquisition. If it is determined from the speech recognition engine 150 that the mood of the driver 1 differs from a baseline values, the speech recognition engine 150 may generate indicia that corresponds to such mood, where particular moods ranging from mild agitation to higher degrees of frustration up to overt signs of anger could be correlated to quantifiable levels of voice command timeout delays, as well as more abbreviated forms of infotainment system 100 response, both of which are discussed below in conjunction with FIG. 5. Likewise, indicia that the driver 1 is happy (such as by audio or visual detection of whistling, humming, singing, smiling, waving or the like) could be converted by the speech recognition engine 150 into quantifiable levels of voice command activity where no such delay is needed.

Thus, upon receipt of suitable voice commands 2, the speech recognition engine 150 comprises a baseline driver voice profile, as well as an instant driver voice profile. The first portion of the driver characteristic data that can be turned into a baseline driver voice profile (which can be correlated to a driver mood profile) can be done at a different time than that of the second portion of the driver characteristic data. For example, in one form, the first portion can be recorded when the driver 1 first purchases the vehicle 10 new at a dealership. Differences between the baseline profile and the instant profile are used by the various tone identification and matching (such as those of the matching analyzers 150C) to determine which driver mood is closest to the sampled profile.

Referring next to FIG. 5, an example of how dynamic speech recognition parameter tuning in accordance with the present disclosure works. First, a speech recognition session can be initiated by the driver in what is referred to as an audio receiving portion of the dialogue session in that the HMI 200 is receiving a voice command from the driver 1, such as by depressing a talk button 51 on steering wheel 50A. This activates the microphone 330A and provides a signal to the driver (such as through a beep, flashing light or other audio or visual cue) to indicate to the driver that the system 100 is ready to accept speech input. Speech timeouts include both an end-of-speech timeout $T_{EOS}$ and a maximum speech timeout $T_{MS}$, where the former takes into account driver 1 pauses during the open microphone 330A session and the latter defines a maximum duration of time by which the system 100 accepts a complete command from the driver 1. Once either of these timeouts occur, the sensor (i.e., microphone) 330A is closed and the speech recognition engine 150 starts processing the received voice command 2 input. In one sequence, the voice command 2 from driver 1 is received by the HMI 200 where it may then be recorded, either to memory 430 or to a separate cache memory or other temporary storage (not shown).

It is expected that because the infotainment system 100 is situated in a vehicular environment, a significant amount of extraneous audio input (in the form of background noise coming from the motive power unit 40 or other operational components within vehicle 10, wind noise due to movement of the vehicle 10, traffic noise, occupant conversation from within the passenger compartment 60 or the like) may be included during such an open microphone audio receiving portion of the dialogue session. As such, it is beneficial to keep both forms of speech timeout $T_{EOS}$ and $T_{MS}$ as brief as possible to avoid picking up as much extraneous background noise as possible, while also ensuring that the time period isn't so short that adequate voice command 2 samples are not acquired. As such, there is a balance to be struck between having the system 100 avoid prematurely sensing that the driver 1 is done speaking then closing the microphone 330A on one hand, while avoiding having the system 100 leave the microphone 330A in the "on" or "record" mode too long such that it picks up too much extraneous background noise on the other.

The advantage of adjusting these parameters dynamically is that the driver 1 can issue voice commands in different traffic conditions, noise conditions or perceived driver moods and be able to have the infotainment system 100 complete the intended task in a way that is substantially transparent to the driver regardless of such conditions or mood. For example, under so-called "normal" driving conditions (i.e., where the driver 1 is experiencing neither an elevated cognitive load nor an angry, agitated or otherwise stressed mood where driver patience is limited), the duration of time associated with the end-of-speech timeout $T_{EOS}$ and a maximum speech timeout $T_{MS}$ is established. As such, driver 1 agitation (anger, frustration or the like) can be mapped to quantifiably different system 100 voice input and response times.

In one non-limiting example, the maximum speech timeout $T_{MS}$ may be set for 10 seconds. This duration may be needed for situations where the driver 1 is speaking a long command, such as a ten digit or longer telephone number or a long navigation or destination address. If the traffic pattern data or vehicular position data indicate that the driver 1 is in a lower cognitive load environment, such as an open road with no traffic, 10 seconds may be more than ample time for the driver 1 to utter the desired voice command. Contrarily, in circumstances where the driver 1 is sensed as being in a different mood or under an elevated cognitive load (such as in heavy traffic conditions, crowded freeway conditions or in city conditions where there are multiple quick upcoming maneuvers), the driver 1 may not be able to complete the voice command within the allotted time, after which the HMI 200 will truncate the voice command by turning off the microphone 330A. Similarly, the end-of-speech timeout $T_{EOS}$ only allows the driver 1 to pause only for a much shorter time between successive words in a command. In one non-limiting example, the end-of-speech timeout $T_{EOS}$ may only permit between about 700-800 millisecond between words. Thus, if a driver 1 intends to issue the command "Call John Smith" and then pauses for more than 700-800 milliseconds after saying "Call John" but before saying "Smith", the HMI 200 will turn off the microphone 330A under the erroneous belief that the driver 1 has finished speaking.

Thus, under increased cognitive load conditions such as those sensed and processed by the computer 400, as well as those where the driver 1 mood (such as when the driver 1 is angry, frustrated, impatient, excited or the like) differs from the baseline the duration of end-of-speech timeout $T_{EOS}$ and a maximum speech timeout $T_{MS}$ may be lengthened. Such dynamic adjustments are especially helpful in situations where task completion rate is important, an example of which is when in-vehicle telecommunications is used and there may be more than one option available for any particular voice command. By way of a non-limiting example, if the driver 1 issues a voice command to call a particular individual that may have numerous associated telephone numbers (such as a home phone, a mobile phone, a work phone or the like), the response system 100 may provide—which may be perfectly acceptable under the so-called normal conditions—an audio response that may be a source of significant distraction or frustration for the driver 1 when he or she is already in an angry, frustrated, impatient or related mood, or when the traffic pattern data or vehicular position data indicate that the driver 1 is in an elevated cognitive load environment. Under such vehicular operating conditions, it is desirable to give the driver 1 more time to enunciate the voice command in a more deliberate, measured manner so as to extend the duration end-of-speech timeout $T_{EOS}$ and a maximum speech timeout $T_{MS}$ for the HMI audio receiving portion of the dialogue session.

This also applies to the HMI 200 response to the voice command 2. For example, when the system 100 provides verbal feedback to the driver 1, under the so-called "normal" circumstances, if the driver 1 issues a voice command 2 that says "Call John", the system 100 provides an audio response that states "there are multiple Johns in your phone book. Which John would you like to call?", to which the driver 1 says "John Smith". The system 100 provides an audio response "John Smith has multiple contact numbers: home, work and mobile; which one would you like to call?", to which the driver 1 says "mobile", after which the system 100 proceeds to provide the response "calling John Smith on mobile" while the telematics portion of the system 100 proceeds to dial the appropriate number and form a wireless connection over one of the far-field wireless networks 700. Contrarily, in circumstances where the driver 1 is sensed as being in a different mood or under an elevated cognitive load as discussed above, the driver 1 may find it annoying that the audio response given by system 100 are verbose. Similarly, if the response is prolix, this can add to the cognitive load during such times as when the driver 1 least needs it. In one embodiment, under such a circumstance, the audio response may be shortened to include on key action phrases rather than complete sentences. For example, if there are numerous entries that might satisfy a particular request, the syntax may change from a more verbose one such as "there are numerous telephone numbers for John Smith; which one do you want?" to something more concise, such as "which telephone for John Smith?" In another embodiment under this circumstance, the system 100 feedback may be changed from verbal prompts entirely such that the response is only given in earcons or related simple tones.

Regardless of whether the system 100 is providing an audio response, video response or a combination of both, there are certain circumstances where the driver 1 cognitive load is determined to be so enhanced that it is preferable to abort the HMI 200 response entirely. Thus, if both the elevated cognitive load profile and the difference between the instant driver mood profile and the baseline driver mood profile is present and detected by system 100, the system 100 response may either pause the response indefinitely or abort it entirely. For example, in such circumstances, the audio response may be silenced for at least long enough to permit the situation giving rise to the enhanced cognitive load to abate, or in an extreme case, canceled altogether.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, the system and methods using the system may be implemented in one or both of software and hardware, and that all variations on the embodiments of such system and method as discussed herein will be understood to be within the scope of the present disclosure. Furthermore, the order of steps associated with such methods may be changed, while various features of the system may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular infotainment system comprising:
    a multimedia device comprising a human-machine interface and at least one of an audio player and a video player;

a plurality of sensors for acquiring driver characteristic data and at least one of traffic pattern data and vehicular positional data; and a computer signally cooperative with the sensors and multimedia device and comprising a processor and a memory signally coupled to one another such that program instructions stored in the memory and executable by the processor:

cause the computer to convert the acquired at least one of traffic pattern data and vehicular positional data into a driver elevated cognitive load profile;

cause the computer to convert a first portion of the driver characteristic data that is input into the multimedia device from the group consisting of voice speed, voice volume, voice frequency and facial expression into a baseline driver mood profile;

cause the computer to convert a second portion of the driver characteristic data that is input into the multimedia device from the group consisting of voice speed, voice volume, voice frequency and facial expression into an instant driver mood profile wherein at least one of the second portion of the driver characteristic data is quantitatively different from a respective one of the first portion of the driver characteristic data;

cause the computer to selectively adjust the amount of time that the human-machine interface accepts the second portion of the driver characteristic data from a driver in situations where a determination is made by the computer of at least one of the elevated cognitive load profile and a difference between the instant driver mood profile and the baseline driver mood profile; and cause the computer to selectively adjust at least one of an audio response and a video response from the multimedia device to a driver in situations where a determination is made by the computer of at least one of the elevated cognitive load profile and a difference between the instant driver mood profile and the baseline driver mood profile, wherein when the computer selectively adjusts at least one of the audio response and the video response from the multimedia device to a driver, it refrains from providing the human-machine interface response at least until such time as the determination by the computer indicates that the respective at least one of the elevated cognitive load profile and the difference between the instant driver mood profile and the baseline driver mood profile is no longer present.

2. The system of claim 1, wherein the human machine interface comprises at least one of a microphone and a camera with which to acquire the driver characteristic data.

3. The system of claim 1, wherein the quantitatively different driver mood profile corresponds to a mood indicative of driver impatience.

4. The system of claim 1, wherein the plurality of sensors for acquiring at least one of traffic pattern data and vehicular positional data further comprises at least one sensor for acquiring at least one of a braking pattern and accelerating pattern.

5. The system of claim 1, wherein the plurality of sensors for acquiring at least one of traffic pattern data and vehicular positional data is selected from the group consisting of a GPS sensor, a visual sensor, a radar sensor, a lidar sensor and an acoustic sensor.

6. The system of claim 1, wherein the computer is further signally cooperative with a driver calendar such that driver meeting schedule data contained therein is conveyed to the computer to convert such schedule data into an additional parameter for the driver elevated cognitive load profile.

7. The system of claim 1, wherein when the computer selectively adjusts at least one of the audio response and the video response from the multimedia device to a driver, it slows down the human-machine interface response.

8. The system of claim 1, wherein when the computer selectively adjusts at least one of the audio response and the video response from the multimedia device to a driver, it speeds up the human-machine interface response.

9. The system of claim 1, wherein when the computer selectively adjusts at least one of the audio response and the video response from the multimedia device to a driver, it provides a different audio feedback to a driver command than that given in response to a driver command where neither the instant driver mood profile or the elevated cognitive load profile are present.

10. The system of claim 1, wherein the at least one of the audio response and the video response from the multimedia device to a driver is aborted once both the elevated cognitive load profile and the difference between the instant driver mood profile and the baseline driver mood profile is present.

11. A vehicle comprising:

a platform comprising a wheeled chassis defining passenger compartment and an engine compartment comprising an engine disposed therein, a guidance apparatus cooperative with the wheeled chassis and the engine in order to provide motive control; and an infotainment system for processing voice input, the infotainment system comprising:

a multimedia device comprising a human-machine interface and at least one of an audio player and a video player;

a plurality of sensors for acquiring driver characteristic data and at least one of traffic pattern data and vehicular positional data; and a computer signally cooperative with the sensors and multimedia device and comprising a processor and a memory signally coupled to one another such that program instructions stored in the memory and executable by the processor:

cause the computer to convert the acquired at least one of traffic pattern data and vehicular positional data into a driver elevated cognitive load profile;

cause the computer to convert a first portion of the driver characteristic data that is input into the multimedia device from the group consisting of voice speed, voice volume, voice frequency and facial expression into a baseline driver mood profile;

cause the computer to convert a second portion of the driver characteristic data that is input into the multimedia device from the group consisting of voice speed, voice volume, voice frequency and facial expression into an instant driver mood profile wherein at least one of the second portion of the driver characteristic data is quantitatively different from a respective one of the first portion of the driver characteristic data;

cause the computer to selectively adjusts the amount of time that the human-machine interface accepts the second portion of the driver characteristic data from a driver in situations where a determination is made by the computer of at least one of the elevated cognitive load profile and a difference between the instant driver mood profile and the baseline driver mood profile; and cause the computer to selectively adjust at least one of an audio response and a video response from the multimedia device to a driver in situations where a determination is made by the computer of at least one of the elevated cognitive load profile and a difference between the instant driver mood profile and the baseline driver mood profile, wherein when the computer selectively adjusts at least one of the audio response and the video response from the multimedia device to a driver, it refrains from providing the human-machine interface response at least until such time as the determination by the computer indicates that the respective at least one of the elevated cognitive load profile and the difference between the instant driver mood profile and the baseline driver mood profile is no longer present.

12. The vehicle of claim 11, wherein the baseline driver mood profile comprises a profile selected from the group consisting of voice speed, voice volume, voice frequency and facial expression, and further wherein the instant driver mood profile comprises a profile selected from the group consisting of voice speed, voice volume, voice frequency and facial expression at least one of which is quantitatively different from a respective baseline voice speed, voice volume, voice frequency and facial expression.

13. A method of controlling interaction between a vehicle driver and an infotainment system, the method comprising:
    acquiring driver characteristic data using at least one sensor mounted within a passenger compartment of a vehicle;
    configuring the infotainment system to comprise:
        a multimedia device with a human-machine interface;
        a computer signally cooperative with the multimedia device and the at least one sensor, the computer comprising a processor and a memory signally coupled to one another; and
        program instructions stored in the memory and executable by the processor;
    using the program instructions to convert a first portion of the driver characteristic data that is input into the multimedia device from the group consisting of voice speed, voice volume, voice frequency and facial expression into a baseline driver mood profile;
    using the program instructions to convert a second portion of the driver characteristic data that is input into the multimedia device from the group consisting of voice speed, voice volume, voice frequency and facial expression into an instant driver mood profile wherein at least one of the second portion of the driver characteristic data is quantitatively different from a respective one of the first portion of the driver characteristic data;
    acquiring at least one of traffic pattern data and vehicular positional data using at least one vehicle-mounted sensor;
    using the program instructions to selectively adjust the amount of time that the human-machine interface accepts the second portion of the driver characteristic data from a driver if a determination is made by the computer of at least one of the elevated cognitive load profile and a difference between the instant driver mood profile and the baseline driver mood profile; and
    using the program instructions to selectively adjust at least one of an audio response and a video response from the multimedia device to a driver if a determination is made by the computer of at least one of the elevated cognitive load profile and a difference between the instant driver mood profile and the baseline driver mood profile, wherein when the computer selectively adjusts at least one of the audio response and the video response from the multimedia device to a driver, it refrains from providing the human-machine interface response at least until such time as the determination by the computer indicates that the respective at least one of the elevated cognitive load profile and the difference between the instant driver mood profile and the baseline driver mood profile is no longer present.

14. The method of claim 13, wherein using the program instructions to selectively lengthen the amount of time that the human-machine interface accepts the second portion of the driver characteristic data from a driver comprises lengthening an end-of-speech timeout.

15. The method of claim 13, wherein using the program instructions to selectively lengthen the amount of time that the human-machine interface accepts the second portion of the driver characteristic data from a driver comprises lengthening a maximum speech timeout.

16. The method of claim 13, wherein using the program instructions to selectively adjust the at least one of the audio response and the video response from the multimedia device to a driver comprises at least one of (a) abbreviating such response relative to when no such at least one of the elevated cognitive load profile and a difference between the instant driver mood profile and the baseline driver mood profile is determined, (b) delaying such response relative to when no such at least one of the elevated cognitive load profile and a difference between the instant driver mood profile and the baseline driver mood profile is determined and (c) aborting such response when both the elevated cognitive load profile and a difference between the instant driver mood profile and the baseline driver mood profile is determined.

17. The method of claim 13, wherein using the program instructions to selectively adjust the at least one of the audio response and the video response from the multimedia device to a driver comprises delivering at least one earcon to the driver.

* * * * *